United States Patent [19]

Haberl et al.

[11] Patent Number: 4,572,479
[45] Date of Patent: Feb. 25, 1986

[54] CAMERA TRUCK

[75] Inventors: Karl Haberl; Klaus Resch, both of Munich, Fed. Rep. of Germany

[73] Assignee: Film-Gerate-Verleith Schmidle & Fritz, Munich, Fed. Rep. of Germany

[21] Appl. No.: 622,187

[22] Filed: Jun. 19, 1984

[30] Foreign Application Priority Data

Jun. 23, 1983 [DE] Fed. Rep. of Germany ....... 3322677

[51] Int. Cl.4 .............................................. B66F 3/00
[52] U.S. Cl. .................................................. 254/2 R
[58] Field of Search .................. 187/95; 254/2 R, 2 B

[56] References Cited

U.S. PATENT DOCUMENTS

| | | | |
|---|---|---|---|
| 1,936,195 | 11/1933 | Honig | 187/95 |
| 2,228,227 | 1/1941 | Eames | 187/95 |
| 3,329,240 | 7/1967 | Harwood et al. | 187/95 |
| 3,472,341 | 10/1969 | Stammen | 187/95 |
| 4,337,845 | 7/1982 | Zelli et al. | 254/2 R |
| 4,360,187 | 11/1982 | Chapman | 254/2 R |

Primary Examiner—Robert C. Watson

Attorney, Agent, or Firm—Holman & Stern

[57] ABSTRACT

A camera truck having a vertical lifting column (9) used for vertical adjustment of the camera comprising an outer column part (10) resting on the chassis, an intermediate column part (11) adapted to be extended telescopically from said outerpart, and a central column part (12) carrying the camera and itself capable of being extended out of the intermediate column part, the column parts having a square cross-section. Wheels (21, 22) used for guiding the column parts relatively to one another are mounted between the column parts and to minimize the spacing between the walls (17, 18) of adjacent column parts, i.e., to allow the use of wheels (21, 22) of relatively large diameter, and to reduce the stresses in the walls in the transverse direction, the wheels (21, 22) are mounted to be rotatable about journals (23, 24) on axes substantially transversely with respect to the outer sides of the column parts, or the central axis of the column. Guide strips (25, 26) extending parallel to the column axis project transversely from the outer sides of the respective adjacent column part (17, 18) between the wheels and are engaged on both sides in each case by a pair of wheels (21, 22).

10 Claims, 2 Drawing Figures

CAMERA TRUCK

BACKGROUND OF THE INVENTION

1. Field Of The Invention

The invention relates to a camera truck with a vertical lifting column used for vertical adjustment of the camera and comprising an outer column part resting on the chassis, an intermediate column part adapted to be extended telescopically from said outer part, and a central column part carrying the camera and itself capable of being extended from the intermediate column part, and also wheels which are used for guiding the column parts relatively to one another and which are mounted between the square-section column parts.

2. Description Of The Prior Art

In a known camera truck of this kind (older Application No. P 32 36 837) the wheels are rotatably mounted in bearing blocks which themselves are secured on the inner walls of the column parts. Since the shafts of the wheels are situated parallel to the walls of the column parts, the diameter of the wheels depends on the spacing of the walls of neighboring column parts. Consequently, the diameters of the wheels must necessarily be kept very small, which is disadvantageous. Transverse stresses in the extended column parts are transmitted via the wheels to the walls of the column parts transversely to the plane thereof. To keep deformation of the walls to a low level, the walls have to be given relatively thick dimensions.

BRIEF SUMMARY OF THE INVENTION

The invention has as its object to develop further the camera truck of the kind specified initially in such a manner that despite compact construction it is possible to have wheel guiding with wheels of relatively large dimensions, and stresses in the walls of the column parts can be taken up more readily.

The camera truck wherein the aforesaid object is achieved is characterized substantially in that the wheels are mounted to be rotatable about journals arranged transversely with respect to the outsides of the column parts, and that guide strips arranged parallel to the column axis and projecting transversely from the outsides of the respective neighboring column part are associated with the wheels.

The invention is based on the realization that the stresses of the walls of the column parts can be reduced and wheels with a large diameter in relation to the spacing of the walls can be situated in the narrow space left between the adjacent walls of the column parts displaceable in one another, and satisfactory guiding can be ensured, if the wheels are swung around through 90° relatively to the known construction mentioned initially, and they are made to cooperate with guide strips which project transversely from the walls of the column parts. Conveniently, the wheels are formed of running wheels in the form of ball bearings with strengthened race rings.

It has been found particularly advantageous from construction and functional points of view to provide a construction wherein a guide strip which is engaged at both sides by the wheels is associated with each pair of wheels.

To ensure satisfactory abutment of the wheels on the guide strip and thus a reliable relative movement of the column parts in relation to one another, one of the two wheels in each case could be displaceable towards the other wheel, and spring-loaded. A particularly simple construction arrangement wherein such a wheel mounting arrangement is not needed and yet secure abutment of the wheels on the guide strip is ensured, can be achieved if the axes of the wheels of a wheel pair form with one another a very small acute angle of about 1° in the sense of a slight convergence towards one another of their free ends in the non-loaded state. In this way, when the guide strip is inserted into the gap between the two wheels a very small elastic deformation of the wheel shafts or the wall of the relevant wheel part on which the shafts are secured occurs. It has been found that this elastic deformation is sufficient to ensure the required abutment or guiding contact with the strip.

BRIEF DESCRIPTION OF THE DRAWINGS

Further details, advantages and features of the invention are shown in the following description with reference to the accompanying drawings which show a form of the invention by way of example, and wherein.

DETAILED DESCRIPTION

Figure 1:
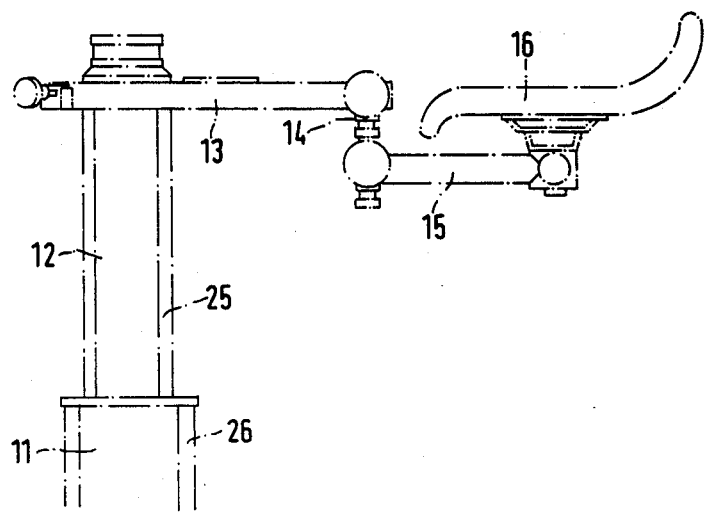
FIG. 1 is a schematic side elevational view of the camera truck according to the invention with its lifting column in the lowered and lifted positions.
Figure 1:
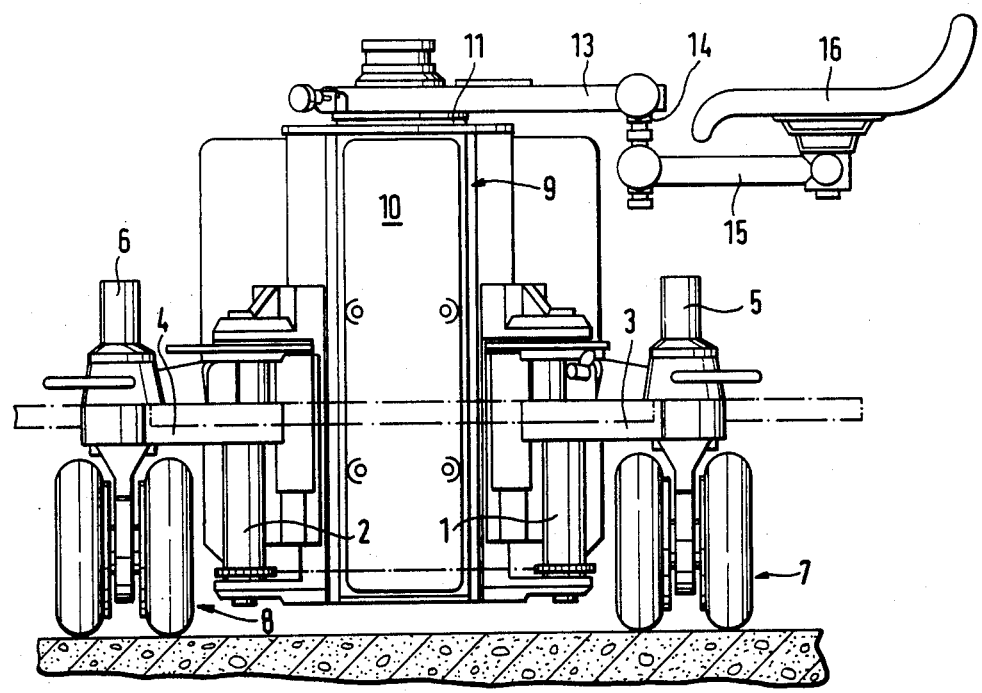

As the drawings show, the camera truck shown diagrammatically in FIG. 1 comprises a chassis with supporting arms 3, 4 pivotable about vertical shafts 1, 2, bearings being provided on the arm ends for wheel pairs 7, 8 slewable about shafts 5, 6. An important component of the camera truck is constituted by the vertical lifting column 9 which serves for vertical adjustment of the camera (not shown) and which comprises an outer column part 10 resting on the chassis, an intermediate column part 11 adapted to be extended out of said outer part in telescopic manner, and a central column part 12 adapted to be extended from the intermediate column part 11. Rotatably mounted on the upper end of the central column part 12 is a projecting arm 13 on which a camera can be secured on the one hand, whereas on the outer end of the arm 13 a supporting pivot 14 with a supporting arm 15 for a seat 16 for a cameraman is mounted. Thus, the cameraman can participate in the lifting and lowering movements of the camera, and this greatly facilitates his camera work.

Figure 2:
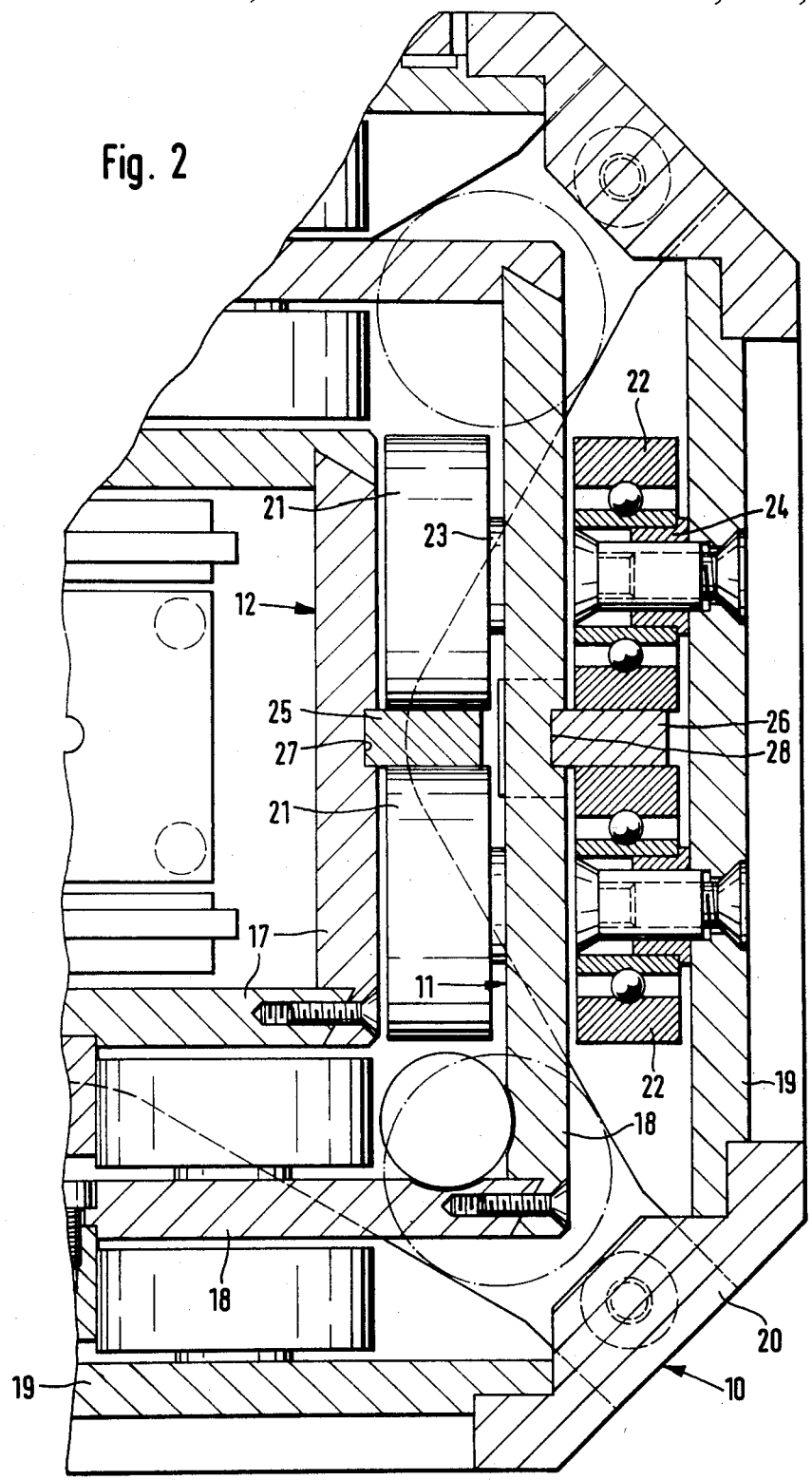
FIG. 2 shows a horizontal cross-sectional view through one half of the lifting column.

FIG. 2 shows that the central column part 12 has four walls 17 connected to one another by screwed connections. The intermediate column part 11 also comprises four walls 18 connected to one another by screwed connections. The outer column part 10 also has four walls 19, but these are connected to one another not directly but by way of intermediate elements 20. On the walls 18 and 19 of the intermediate and outer column parts 11 and 10, respectively in each case, a pair of wheels 21 and 22 is mounted to be rotatable about journals 23 and 24, respectively, extending transversely to the outer sides of the column parts. These wheels 21 and 22 are in each case formed of running wheels in the form of ball bearings with a reinforced race ring. As the illustration shows, there is associated with each pair of wheels 21 or 22, respectively, a guide strip 25 or 26 engaged at both sides by the wheels, and in fact, they extend parallel to the column axis and project transversely from the outer sides of the respective adjacent column part 11 or 12 as the case may be. Each guide strip 25, 26 is, on the axial plane of the relevant column, connected to the associated wall 17, 18 of the column part 12, 11, respectively. For this purpose, there is formed in each wall 17, 18 a groove 27, 28, respectively, for receiving one edge of the guide strip 25, 26. The guide strips 25, 26 are connected by screwed connections to the associated walls 17 and 18, respectively.

In a manner which is not shown in FIG. 2, the journals 23 and 24 of the wheels of a pair of wheels are not situated parallel to one another. On the contrary, they form a very small acute angle of about 1° with one another in the sense of approaching one another slightly with their free ends in the non-loaded state. On introduction of the guide strip 25 or 26 as the case may be into the gap between the two wheels 21 or 22 of the associated pair of wheels, consequently a very small elastic deformation of the wheel journals 23, 24 and also of the wall 18, 19 of the relevant column part 11, 10 on which the journals are secured occurs. The elastic deformation thus achieved guarantees the requisite guiding abutment of the wheels on the associated guide strips when the column parts are retracted and extended.

We claim:

1. In a camera truck having a vertical lifting column for vertical adjustment of the camera including a chassis, an outer column part resting on the chassis, an intermediate column part within and adapted to be extendable telescopically from said outer part, a central column part within and adapted to be extendable from the intermediate column part, each column part being substantially rectangular in cross-section and formed by interconnected walls, the camera being supported on the central column part, and guide wheels for guiding the column parts relatively to one another, the improvement comprising:

said column parts are spaced with respect to each other to provide spaces between adjacent walls;

elongated guide strips extending parallel to the longitudinal axis of said column and projecting transversely from the outer sides of the walls of said central and intermediate column parts into the respective spaces between said walls, each guide strip having two guiding surfaces;

wheel journals supported at one end in at least two walls of said column parts transversely with respect to said outer sides; and a plurality of pairs of guide wheels rotatably mounted on said journals in said spaces between said adjacent walls with the axes of rotation of the guide wheels of each pair intersecting at a small acute angle of approximately 1° when the free ends of said journals are in an unloaded state wherein said guide wheels are disengaged from said guide strip so that each pair cooperatively engages both guiding surfaces of a respective guide strip to firmly and accurately guide the telescoping column parts during extension and retraction thereof.

2. Camera truck according to claim 1, wherein said guide wheels comprise:

running wheels in the form of ball bearings having a reinforced race ring.

3. A camera truck as claimed in claim 1, wherein:

each guide strip is disposed on a plane passing through the longitudinal axis of the respective column part.

4. A camera truck as claimed in claim 2, wherein:

each guide strip is disposed on a plane passing through the longitudinal axis of the respective column part.

5. A camera truck as claimed in claim 1 and further comprising:

guide strip grooves in said outer sides of the walls;

one longitudinal edge of each guide strip is received and mounted in a respective one of said grooves; and means for attaching said guide strips in said grooves.

6. A camera truck as claimed in claim 3 and further comprising:

guide strip grooves in said outer sides of the walls;

one longitudinal edge of each guide strip is received and mounted in a respective one of said grooves; and means for attaching said guide strips in said grooves.

7. A camera truck as claimed in claim 4 and further comprising:

guide strip grooves in said outer sides of the walls;

one longitudinal edge of each guide strip is received and mounted in a respective one of said grooves; and means for attaching said guide strips in said grooves.

8. A camera truck as claimed in claim 5, wherein:

said attaching means comprises a screw threaded connector.

9. A camera truck as claimed in claim 6, wherein:

said attaching means comprises a screw threaded connector.

10. A camera truck as claimed in claim 7, wherein:

said attaching means comprises a screw threaded connector.

* * * * *